US005469821A

United States Patent [19]

Gosch

[11] Patent Number: 5,469,821

[45] Date of Patent: Nov. 28, 1995

[54] CYLINDER BLOCK AND METHOD OF MAKING THE SAME

[75] Inventor: Rolf Gosch, Lahnau, Germany

[73] Assignee: EB Brühl Aluminiumtechnik GmbH, Brühl, Germany

[21] Appl. No.: 176,038

[22] Filed: Dec. 30, 1993

[30] Foreign Application Priority Data

Dec. 30, 1992 [DE] Germany .......................... 42 44 502.7

[51] Int. Cl.$^6$ .............................. F02F 7/00; C22C 21/02; F16M 1/021; F16J 10/04

[52] U.S. Cl. ..................................... 123/193.2; 29/890.08

[58] Field of Search ............................. 123/90.51, 193.2, 123/193.3, 193.5; 29/890.08, 888.06, 888.061; 419/11, 23; 420/548; 75/236, 245

[56] References Cited

U.S. PATENT DOCUMENTS

| | | | |
|---|---|---|---|
| 3,932,228 | 1/1976 | Sugiyama et al. | 123/193.2 |
| 4,598,675 | 7/1986 | Long | 123/90.51 |
| 4,650,644 | 3/1987 | Huret et al. | 123/193.2 |
| 4,986,230 | 1/1991 | Panyard et al. | 123/193.2 |
| 5,131,356 | 7/1992 | Sick et al. | 123/193.2 |
| 5,142,863 | 9/1992 | Ushio et al. | 29/890.08 |

OTHER PUBLICATIONS

"Materials and Processes in Manufacturing" by Paul DeGarmo Macmillan Company Dec. 1969.

*Primary Examiner*—Marguerite Macy
*Attorney, Agent, or Firm*—Darby & Darby

[57] ABSTRACT

A cylinder block composed of a hypoeutectic aluminum alloy has cylinder liners of the same material. The cylinder liners contain SiC particles for wear resistance.

26 Claims, 1 Drawing Sheet

CYLINDER BLOCK AND METHOD OF MAKING THE SAME

FIELD OF THE INVENTION

The invention relates generally to a cylinder block.

BACKGROUND OF THE INVENTION

Cylinder blocks consisting of hypoeutectic aluminum alloys cannot provide running surfaces of adequate wear resistance for cast iron piston rings. Current practice for obtaining the required wear resistance is to cast or press gray cast iron cylinder liners into such cylinder blocks. However, for recycling purposes, gray cast iron cylinder liners which are cast into cylinder blocks of hypoeutectic aluminum alloys make it difficult to melt worn blocks and return these to the aluminum production cycle. On the other hand, gray cast iron cylinder liners which are pressed into cylinder blocks of hypoeutectic aluminum alloys must be removed by means of an expensive drawing operation before worn blocks can be melted and returned to the aluminum-production cycle.

If the blocks and their ferrous components are shredded, an additional separating procedure must be performed before worn blocks can be melted.

Cylinder blocks of hypoeutectic aluminum alloys can also be galvanically coated with wear-resistant running surfaces (trade name "Nikasil"). However, this requires galvanic treatment with a relatively large number of cleaning, covering and immersing operations.

Further known are cylinder blocks of hypereutectic aluminum alloys in which wear-resistant running surfaces can be produced by honing and etching in order to partially expose primary silicon particles present in the material. These cylinder blocks are capable of being recycled as desired and provide good results as regards the wear resistance of their running surfaces.

Another method of making cylinder blocks having silicon particles at the running surfaces involves the use of compressed preforms containing ceramic fibers. Prior to casting of a cylinder block, the preforms are placed in the mold. When the mold is filled with a hypoeutectic aluminum alloy, the preforms are infiltrated so that a fibrous surface having the desired wear resistance is obtained. This method has the disadvantage that an additional manufacturing operation is required for the special preforms.

SUMMARY OF THE INVENTION

It is an object of the invention to provide a cylinder block which has running surfaces of good wear resistance and can be easily recycled.

Another object of the invention is to provide a cylinder block which has relatively highly wear-resistant running surfaces and can be manufactured using mass production techniques.

An additional object of the invention is to provide a hypoeutectic aluminium alloy cylinder block which has running surfaces of good wear resistance, can be readily recycled and can be mass produced.

A further object of the invention is to provide a method of making a cylinder block which has relatively highly wear-resistant running surfaces and can be recycled relatively simply.

It is also an object of the invention to provide a method which makes it possible to mass produce cylinder blocks having running surfaces of good wear resistance.

Yet another object of the invention is to provide a method capable of mass producing hypoeutectic aluminium alloy cylinder blocks which have relatively highly wear-resistant running surfaces and can be readily recycled.

The preceding objects, as well as others which will become apparent as the description proceeds, are achieved by the invention.

One aspect of the invention resides in a cylinder block for an engine having a cylinder, and a liner for the cylinder made from a material containing silicon carbide particles. The cylinder block is preferably composed at least in part of a hypoeutectic aluminum-containing alloy or substance.

Another aspect of the invention resides in a method of making a cylinder block for an engine. The method comprises the steps of providing a cylinder block having a cylinder, producing a melt and processing the melt to form a liner for the cylinder containing silicon carbide particles. The processing step includes casting the liner from the melt. It is also possible to form a liner by extrusion.

The material may comprise an aluminium-containing material. The particles can be present in the material and, in such an event, preferably constitute 10 to 20% of the material.

According to one embodiment of the method, the liner is ready-made outside of the cylinder and then cast into the cylinder while casting the cylinder block enclosing the liner. The processing step may here involve solution treating the liner in the cylinder and thereafter age hardening the liner in the cylinder.

In accordance with another embodiment of the method, the liner is ready-made outside of the cylinder and then inserted in the latter by pressing or shrinking the liner. The processing step in this embodiment can include a solution treatment and subsequent age hardening of the liners before the liner is inserted in the cylinder.

A cylinder liner according to the invention thus has ceramic particles distributed therein. This cylinder liner may exhibit better wear resistance than a cylinder liner consisting of a hypereutectic alloy with primary silicon particles or one consisting of a molded ceramic fiber body infiltrated by a hypoeutectic alloy. In comparison to known cylinder blocks, the cylinder block of the invention has the advantage that manufacture is greatly simplified and can involve conventional casting processes.

BRIEF DESCRIPTION OF THE DRAWINGS

Other features and advantages of the invention will become apparent from the following detailed description of preferred embodiments when read in conjunction with the accompanying drawings.

DESCRIPTION OF PREFERRED EMBODIMENTS

Figure 1:
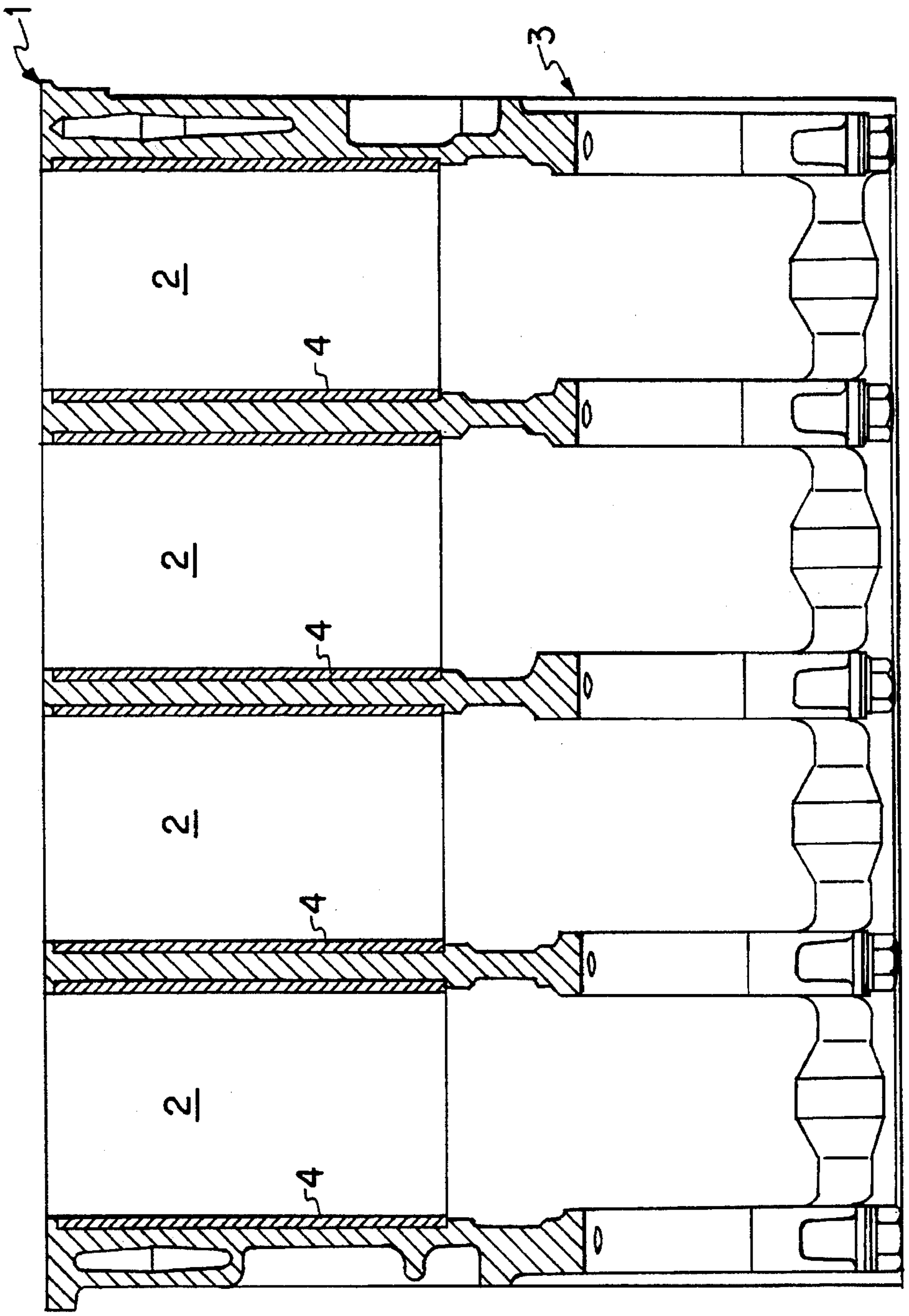
FIG. 1 is a partly sectional view of a cylinder block and crankcase of an engine, the cylinder block having cylinder liners according to the invention.

FIG. 1 shows a cylinder block 1 which, according to the invention, is advantageously composed of a readily castable, hypoeutectic aluminum alloy or substance. For example, the cylinder block 1 can be composed of $AlSi_5Cu_3$, $AlSi_6Cu_4$, $AlSi_9Cu_3$, $AlSi_7Mg$. The cylinder block 1, which is provided with one or more cylinders 2, is integral with a crankcase 3.

The combined cylinder block and crankcase 1, 3 can be constituted by a casting. Production of the cylinder block and crankcase 1, 3 can be carried out using a casting process with pure gravity feed. This is not possible in the prior art production process involving infiltration of a molded body.

Figure 2:
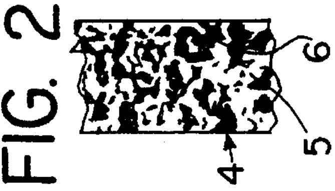
FIG. 2 is a greatly enlarged view showing details of a cylinder liner of FIG. 1.

Each cylinder 2 of the cylinder block 1 is provided with a cylinder liner 4 which is produced separately from the cylinder block 1. The cylinder liners 4 are composed of an aluminum alloy or material containing SiC particles for wear resistance. This is shown in FIG. 2 where the reference numeral 5 identifies an aluminum alloy matrix and the reference numeral 6 identifies SiC particles embedded in the matrix 5. The SiC particles preferably constitute at least 10%, and at most 20%, of the material. The particle size is advantageously in the range of 20 to 60 micrometers.

With the exception of the SiC particles, the aluminum alloy for the cylinder liners 4 can be identical to that for the cylinder block 1. In other words, similarly to the cylinder block 1, the cylinder liners 4 can be composed of a readily castable, hypoeutectic aluminium alloy.

Figure 3:
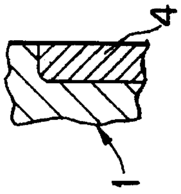
FIG. 3 is an enlarged fragmentary sectional view illustrating a cylinder liner in accordance with the invention which has been cast into a cylinder block.

One manner of providing the cylinder block 1 with the cylinder liners 4 is to cast the ready-made liners 4 into the cylinders 2 of the cylinder block 1 when casting the cylinder block. Due to their low mass, preheating of the liners 4 can here be avoided in contrast, for example, to gray cast iron liners. FIG. 3 illustrates a cylinder liner 4 which has been cast into the cylinder block 1.

When the cylinder liners 4 are cast into the cylinder block 1, the heat supplied to the liners 4 during casting-in, and also during cooling of the cylinder block 1, can effect a heat treatment of the liners 4. If the cylinder liners 4 achieve a temperature of the order of 530 degrees Centigrade upon being cast into the cylinder block 1 so that the liners 4 undergo a solution treatment, then casting-in of the liners 4 into the cylinder block 1 can cause age hardening of the liners 4. As is known, age hardening can-improve the mechanical properties and, in particular, increase the hardness, of the liners 4.

Figure 4:
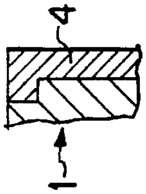
FIG. 4 is an enlarged fragmentary sectional view illustrating a cylinder liner according to the invention which has been pressed into a cylinder block.

Another manner of providing the cylinder block 1 with the cylinder liners 4 is to make the liners 4 apart from the cylinder block 1 and then insert the ready-made liners 4 in the cylinders 2 of the cylinder block. Insertion of the liners 4 in the cylinders 2 can be accomplished by pressing the liners 4 into the cylinders 2 or by effecting thermal shrinking of the liners 4 so that they can be slipped into the cylinders 2. FIG. 4 shows a cylinder liner 4 which has been inserted in the cylinder block 1 by pressing-in or a shrinking process. The liners 4 can here be subjected to a completely independent heat treatment in order to achieve optimum mechanical properties. Such heat treatment will again involve solution treatment followed by age hardening.

A ready-made material consisting essentially of an aluminium-alloy with the SiC particles 6 dispersed therein may be used to make the cylinder liners 4. This material can be prepared by adding the SiC particles 6 to the alloy. The material can be a melt for casting the liners or an extrusion compound for extruding the liners. When the liners 4 are cast, the casting conditions are controlled in such a manner that the SiC particles 6 do not liquefy. In the solidified state, the SiC particles 6 are firmly embedded in the aluminium alloy matrix 5.

In contrast to prior art cylinder blocks with gray cast iron cylinder liners, the cylinder block 1 of the invention is relatively lightweight, simple to manufacture and easy to recycle while, at the same time, possessing running surfaces of high wear resistance.

Various modifications can be made within the meaning and range of equivalence of the appended claims.

I claim:

1. A cylinder block for an engine, having a cylinder; and a separately made liner for said cylinder, the material of said liner being composed at least in part of a hypoeutectic aluminum-containing material having silicon carbide particles dispersed therein; wherein said block is composed at least in part of a hypoeutectic aluminum-containing substance.

2. The cylinder block of claim 1, wherein said a particles constitute at least 10% of said material.

3. The cylinder block of claim 1, wherein said particles constitute at most 20% of said material.

4. The cylinder block of claim 1, wherein said particles have a size of at least 20 micrometers.

5. The cylinder block of claim 1, wherein said particles have a size of at most 60 micrometers.

6. The cylinder block of claim 1, wherein said substance of said block is composed at least in part of one of the group of a hypoeutectic $AlSisCu_3$ or $AlSi_6Cu_4$ or $AlSi_7Mg$ or $AlSi_9Cu_3$ alloy.

7. A method of making a cylinder block for an engine, comprising the steps of:

providing a cylinder block having a cylinder and composed at least in part of a hypoeutectic aluminum containing substance;

providing a hypoeutectic aluminum-containing material having silicon carbide particles dispersed therein; and processing said material to form a liner for said cylinder, the processing step including casting said liner from said material.

8. The method of claim 7, wherein said particles are present in, and constitute at least 10% of, said material.

9. The method of claim 7, wherein said particles are present in, and constitute at most 20% of, said material.

10. The method of claim 7, wherein said material comprises an aluminum-containing material.

11. The method of claim 7, wherein said cylinder block is composed at least in part of a hypoeutectic aluminum-containing substance.

12. The method of claim 7, wherein said liner is casting into said cylinder during casting of said cylinder block.

13. The method of claim 12, wherein the processing step comprises age hardening said liner in said cylinder.

14. The method of claim 13, wherein the processing step comprises solution treating said liner prior to said age hardening.

15. The method of claim 7, further comprising the step of inserting said liner in said cylinder by pressing-in or thermal shrinking and slipping said liner into said cylinder block.

16. The method of claim 15, wherein the processing step comprises solution treating said liner prior to the inserting step.

17. A method of making a cylinder block for an engine, comprising the steps of:

providing a cylinder block having a cylinder and composed at least in part of a hypoeutectic aluminum containing substance;

providing a hypoeutectic aluminum-containing material having silicon carbide particles dispersed therein; and processing said material to form a liner for said cylinder, the processing step including extruding said liner from said material.

18. The method of claim 17, wherein said particles are present in, and constitute at least 10% of, said material.

19. The method of claim 17, wherein said particles are present in, and constitute at most 20% of, said material.

20. The method of claim 17, wherein said material comprises an aluminum-containing material.

21. The method of claim 17, wherein said cylinder block is composed at least in part of a hypoeutectic aluminum-containing substance.

22. The method of claim 17, wherein said liner is casting into said cylinder during casting of said cylinder block.

23. The method of claim 22, wherein the processing step comprises age hardening said liner in said cylinder.

24. The method of claim 23, wherein the processing step comprises solution treating said liner prior to said age hardening.

25. The method of claim 17, further comprising the step of inserting said liner in said cylinder by pressing-in or thermal shrinking and slipping said liner into said cylinder block.

26. The method of claim 25, wherein the processing step comprises solution treating said liner prior to the inserting step.

* * * * *